United States Patent
Kalar et al.

(10) Patent No.: US 8,897,608 B2
(45) Date of Patent: Nov. 25, 2014

(54) HIGH SAMPLING RESOLUTION DTS SYSTEM AND METHOD

(75) Inventors: Kent Kalar, Austin, TX (US); Kari-Mikko Jaaskelainen, Katy, TX (US); David Barfoot, Austin, TX (US)

(73) Assignee: SensorTran, Inc., Houston, TX (US)

( * ) Notice: Subject to any disclaimer, the term of this patent is extended or adjusted under 35 U.S.C. 154(b) by 181 days.

(21) Appl. No.: 13/376,629

(22) PCT Filed: Jun. 8, 2010

(86) PCT No.: PCT/US2010/001649
§ 371 (c)(1),
(2), (4) Date: Dec. 7, 2011

(87) PCT Pub. No.: WO2010/144129
PCT Pub. Date: Dec. 16, 2010

(65) Prior Publication Data
US 2012/0105826 A1  May 3, 2012

Related U.S. Application Data

(60) Provisional application No. 61/268,083, filed on Jun. 8, 2009.

(51) Int. Cl.
*G02B 6/00* (2006.01)
*G01K 11/32* (2006.01)
*G01D 5/353* (2006.01)

(52) U.S. Cl.
CPC ............... *G01K 11/32* (2013.01); *G01D 5/353* (2013.01); *G01K 2011/324* (2013.01)
USPC .......................................................... 385/12

(58) Field of Classification Search
CPC . G01K 2011/324; G01K 11/32; G01D 5/353; G01D 5/268
USPC .......................................................... 385/12
See application file for complete search history.

(56) References Cited

U.S. PATENT DOCUMENTS

| | | |
|---|---|---|
| 6,222,861 B1 | 4/2001 | Kuo et al. |
| 6,285,446 B1 * | 9/2001 | Farhadiroushan ........... 356/35.5 |
| 6,370,169 B1 | 4/2002 | Imajuku et al. |
| 6,618,404 B2 | 9/2003 | Mattox |
| 6,804,042 B2 | 10/2004 | Mattox |
| 6,817,759 B2 | 11/2004 | Chi et al. |
| 6,870,629 B1 | 3/2005 | Vogel et al. |
| 6,909,732 B2 | 6/2005 | Imajuku et al. |
| 7,023,887 B2 | 4/2006 | Imajuku et al. |
| 7,339,962 B2 | 3/2008 | Farrell et al. |
| 7,389,011 B2 * | 6/2008 | Ogura et al. ................... 385/12 |

FOREIGN PATENT DOCUMENTS

EP  1760424 A1  3/2007

* cited by examiner

*Primary Examiner* — Michael A Lyons
*Assistant Examiner* — Rufus Phillips
(74) *Attorney, Agent, or Firm* — Michael A. Ervin; Krueger Iselin LLP

(57) ABSTRACT

A method of improving sampling resolution in a distributed temperature measurement system using a fiber optic distributed sensor by means of programmed delayed trigger signals to a laser light source in order to improve the spatial resolution of such systems.

1 Claim, 2 Drawing Sheets

Collection 1
Delay = 0
Resolution: 1 meter

Collection 2
Delay = 5ns
Resolution: 1 meter

Sampling from Merged Results
Resolution: 0.5 meters

HIGH SAMPLING RESOLUTION DTS SYSTEM AND METHOD

CROSS REFERENCE TO RELATED APPLICATIONS

This application claims the benefit of U.S. provisional Ser. No. 61/268,083 filed Jun. 8, 2009.

TECHNICAL FIELD

This disclosure relates to distributed temperature measurement systems and more particularly to methods for improving the sampling resolution and thereby the spatial resolution of such systems.

BACKGROUND OF THE INVENTION

Distributed Temperature Sensing (DTS) is widely used across many industries and applications where it is beneficial to collect a large number of temperature points along a structure or process. An optical fiber is used as a sensor and placed in the area where it is desirable to measure the temperature. A short light pulse at a center wavelength is transmitted down the fiber where it interacts with the structure of the fiber and some of the energy is shifted to different wavelengths and scattered back along the fiber through e.g. Raman scattering. Some of the energy is shifted to a higher wavelength called the Stokes wavelength, and some is shifted to a lower wavelength called the anti-Stokes wavelength. The temperature can be calculated as a function of the ratio of the Stokes and anti-Stokes wavelength. The Stokes and anti-stokes signals must be corrected for the wavelength dependent losses along the fiber, and this is often done using the assumption that the difference in optical attenuation between the Stokes and anti-Stokes component is constant over the distance of the fiber with some compensation for thermal effects. The position of the temperature along the fiber is determined by measuring the time of flight between the transmitted and reflected light, and given that the speed of light is known, the location can be calculated. The way to determine the position for Raman based Optical Time Domain Reflectometry (OTDR) DTS technology is similar to what is used in commercially available Optical Time Domain Reflectometry (OTDR) units based on Rayleigh scattering.

The returning backscattered light is converted to an analogue electrical signal using a photo-diode and an electrical amplifier. The analogue signal is digitized using an Analogue to Digital Converter (ADC). The sampling frequency of the ADC determines the sampling resolution of a given system. The laser pulse width and the ADC sampling frequency determine the spatial resolution of a system, i.e. the distance it takes for the system to fully respond to a step change in temperature. The spatial resolution for OTDR based systems used both in the sensing and telecommunications industry is normally on the order of a few meters for high performance system.

Many systems have in the past used the transmitted laser pulse as a trigger mechanism for the start of the data collection by the ADC card. These systems use an additional photodiode to time the laser pulse and convert this into an electrical signal, which in turn is used to start the data collection of the ADC card. This approach adds a signal jitter in the order of +/−1 sampling point, which further drives the demand for a high clock frequency ADC card.

High sampling frequency ADC cards are more expensive than lower sampling frequency ADC cards. The heat generated by the ADC cards is in general proportional to the clock frequency and higher frequency systems normally generate more heat than lower frequency systems. High performance systems tend to be expensive and generate a lot of heat while many applications demand cost effective low power consumption solutions for extended environmental range performance. The lack of cost-effective systems with adequate performance have over many years limited the use of DTS systems in many applications.

Another drawback of the existing systems is the coarse sampling resolution and the impact it has on double ended correction, both on the noise and the spatial resolution. Double ended correction is used to mitigate e.g. hydrogen induced darkening in fibers. An optical fiber is deployed in a loop configuration with both fiber ends tied to the DTS instrument, light is injected from one fiber end and a temperature trace is collected. Light is then injected from the second fiber end and a temperature trace is then collected. Using this data, a differential attenuation factor between the Stokes and anti-Stokes wavelengths can be calculated over the length of the fiber. This differential attenuation factor allows the user to correct for changes and/or non-uniformities of the optical attenuation along the fiber. The two temperature traces must be well aligned to get an accurate and low noise temperature trace where small amounts of misalignment will cause a significant increase in noise. This misalignment between the two temperature traces will also cause degradation in spatial resolution.

BRIEF SUMMARY OF THE DISCLOSURE

The sampling resolution problems of previous art are addressed by the invention of this disclosure by a method of improving sampling resolution to achieve higher spatial resolution in a distributed temperature measurement system using a fiber optic distributed sensor including at least of the steps of: providing a trigger voltage signal from a digitizer to a light source to generate a fixed pulse width light pulse into a sensing fiber; in a first collection set collecting backscattered Raman Stokes and anti-Stokes light components from the sensing fiber at a fixed sampling frequency; calculating a first set of temperatures points along the fiber optic distributed sensor using the intensities of the backscattered Raman Stokes and anti-Stokes light components; in an additional collection set inducing a fixed delay into the trigger voltage signal and collecting backscattered Raman Stokes and anti-Stokes light components from the sensing fiber at a fixed sampling frequency; calculating an additional set of temperatures points along the fiber optic distributed sensor using the intensities of the backscattered Raman Stokes and anti-Stokes light components from the additional collection set; merging the first set of temperature points along the fiber optic distributed sensor with the additional set of temperatures points along the fiber optic distributed sensor to produce a merged set of temperature points along the fiber optic distributed sensor having a higher spatial resolution; repeating the steps of inducing fixed delays into the trigger voltage signal and collecting backscattered Raman Stokes and anti-Stokes light components from the sensing fiber at a fixed sampling frequency and calculating an additional set of temperatures points along the fiber optic distributed sensor and then merging the additional set of temperature points along the fiber optic distributed sensor with the previously merged set of temperatures points along the fiber optic distributed sensor to produce a new merged set of temperature points along the fiber optic distributed sensor having even higher spatial resolution. This repetition is then repeated until a desired degree of spatial resolution is achieved.

The sampling resolution problems of previous art are also addressed by the invention of this disclosure by a system for improving sampling resolution to achieve higher spatial resolution in a distributed temperature measurement system using a fiber optic distributed sensor including at least: a digitizer for transmitting a trigger signal to a laser light source that fires a laser pulse upon receiving said trigger signal; a programmable delay line for receiving said trigger signal from said digitizer and applying a preprogrammed delay time to said trigger signal; an optical switch for transmitting said laser pulse to said fiber optic distributed sensor and receiving backscattered emissions from said fiber optic distributed sensor; an optical filter system for separating different wavelengths of said backscattered emissions from said optical switch; a set of photo-detectors for receiving the different wavelengths from said optical filter system, converting said wavelengths to analog signals, and transmitting said analog signals to said digitizer for conversion to digital signals.

BRIEF DESCRIPTION OF THE SEVERAL VIEWS OF THE DRAWINGS

For a more complete understanding of the present invention, reference is now made to the following drawings, in which.

DETAILED DESCRIPTION

The current invention describes a DTS system and method where a low frequency ADC card is used to build a high performance cost effective system while maintaining low power consumption. The system uses an innovative approach to collect sampling points at fractions of the sampling frequency of the ADC card and thereby significantly increasing the sampling resolution of the system.

The system uses the ADC card system clock as a time reference as opposed to using the detected laser pulse as a time reference. The laser is triggered by the ADC card clock, which removes the clock jitter of +/−1 sampling period experienced by systems using a laser-initiated trigger. The system further uses a variable delay between the ADC sampling points and the laser launch trigger. This delay allows the system to vary the sampling point spatial location in relation to the transmitted and reflected light pulse and in essence varying the spatial resolution.

By adding the different traces onto the same time scale referenced to e.g. the rising edge of the ADC clock, a large number of sampling points with varying spatial locations can be plotted and tied to a spatial reference. The resulting trace will have much finer spatial resolution than conventional systems with a comparable clock frequency. The system and method allows for a variable spatial resolution system with a sampling resolution limited only by the resolution of the delay between the ADC clock and the delayed trigger.

The system and method can be used to design and manufacture a high performance system using the existing state of the art high sampling frequency ADC cards. A system with sampling resolution in the order of cm's or less can be achieved and used for high performance applications where fine sampling resolution is of importance.

The system and method can be used to manufacture a high performance system utilizing a lower frequency ADC card with lower cost and lower power consumption compared with a higher resolution ADC card. If the base case is to use the rising edge of the clock to start the data collection and to launch the laser pulse, then the clock frequency of the ADC card can be reduced by a factor 2 if the delay between ADC card and the laser trigger is a ½ sampling period. An easy way to achieve this would be to trigger the laser of the falling edge of the ADC card clock while the data collection is triggered by the rising edge of the clock. Similarly, using various delays, variable and fine sampling resolution can be achieved.

High sampling resolution can be used to address the need for good spatial alignment in the instance where double ended correction is required. The ability to align the two temperature traces enables a better and easier way to match the two data sets used for double ended correction with improvements in spatial resolution as well as noise properties.

Figure 1:
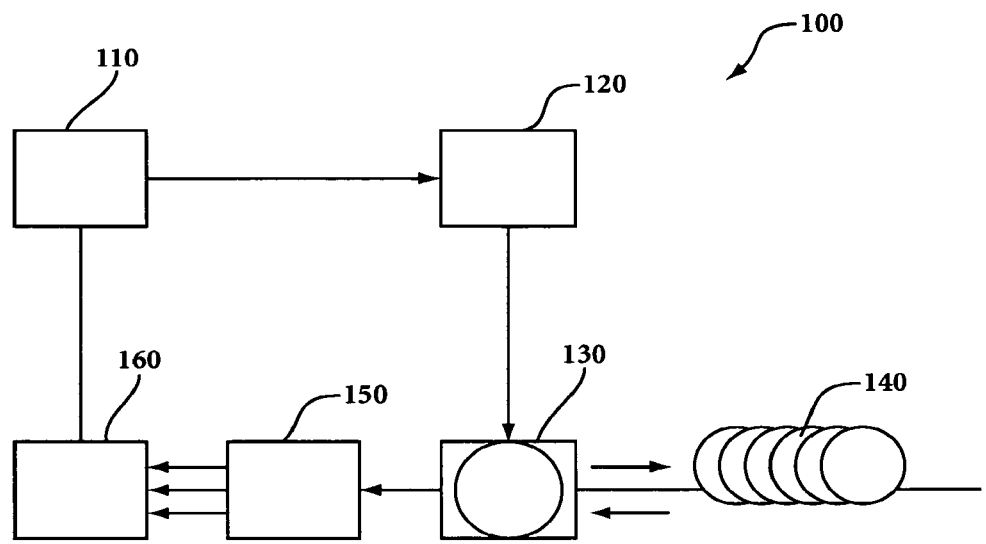
FIG. 1 shows a block diagram of a prior art DTS system.

System 100 shown in FIG. 1 shows common system architecture of the prior art. A digitizer 110, comprising an analog-to-digital (ADC) card is used to send a trigger TTL (transistor-transistor-logic) signal pulse to the system light source, usually a semiconductor diode laser 120. The trigger voltage is often a short duration voltage spike of about 0-5 volts and the laser fires on the rising edge of that spike. System software (not shown) controls the digitizer. Laser 120 then fires a single pulse (for each trigger). The laser pulse travels through optical splitter 130 and travels down the optical fiber to sensor fiber 140, which is deployed to measure temperature in the region of interest.

A short light pulse at a center wavelength is transmitted down sensing fiber 140 and interacts with the structure of the fiber. Some of the energy is shifted to different wavelengths and scattered back along the fiber through e.g. Raman scattering. Some of the energy is shifted to a higher wavelength called the Stokes wavelength, and some is shifted to a lower wavelength called the anti-Stokes wavelength. These backscattered wavelengths travel back to optical switch 130 and through optical filter 150. The different wavelengths are separated by the filter and fed to avalanche photo detectors (APD's) 160. The APD's convert the light signals to analog voltage signals representing the intensity of the separated wavelengths.

The voltage signals from the APD's are analog and are sent to the ADC circuitry of the digitizer 110 where they are converted to digital signals for processing in a programmed signal processor for calculating and displaying the temperature profiles (processor not shown).

The temperature along the sensing fiber can be calculated as a function of the ratio of the intensity of the Stokes and Anti-Stokes wavelength signals. The Stokes and anti-stokes signals must be corrected for the wavelength dependent losses along the fiber, and this is often done using the assumption that the difference in optical attenuation between the Stokes and anti-Stokes component is constant over the distance of the fiber with some compensation for thermal effects. The position of the temperature along the fiber is determined by measuring the time of flight between the transmitted and reflected light, and given that the speed of light is known, the location can be calculated. The way to determine the position for Raman based Optical Time Domain Reflectometry (OTDR) DTS technology is similar to what is used in commercially available Optical Time Domain Reflectometry (OTDR) units based on Rayleigh scattering.

The spatial resolution of systems like that of FIG. 1 is limited by the sampling frequency of the ADC card of digitizer 110 as well as the laser pulse width. A typical sampling frequency of about 100 megahertz results in spatial resolutions of about 1 meter. This can be improved by higher sampling frequency ADC cards but these add both capital and operational cost due to their expense and higher energy consumption and heat generation.

Some prior art systems may use the transmitted laser pulse as a trigger mechanism for the start of the data collection by the ADC card. These systems use an additional photodiode to time the laser pulse and convert this into an electrical signal, which in turn is used to start the data collection of the ADC card. This approach adds a signal jitter in the order of +/−1 sampling point, which further drives the demand for a high clock frequency ADC card The need for higher resolution systems without a requirement of higher frequency ADC cards is addressed by system block diagram 200 shown in FIG. 2. A digitizer 210, comprising again an analog-to-digital (ADC) card is used to send a trigger TTL signal pulse toward system light source 230. The TTL trigger passes through a programmable digital delay line (PDDL) 220 which can be programmed with the capability of providing fixed digital delays into the trigger signal.

In operation, the use of the PDDL allows a series of data collections each with a fixed delay from the PDDL. Another series of collection can then be made with a different fixed delay. The resulting collections have the data sampling locations along the sensing fiber effectively shifting spatially based on the length of the delay. A delay of 10 nanoseconds results in a spatial shift of 1 meter. Commercially available PDDL circuits are capable of delays in steps of 0.25 nanoseconds.

The trigger voltage is often a short duration voltage spike of about 0-5 volts and the laser fires on the rising edge of that spike. System software (not shown) controls the digitizer. Laser 230 then fires a single pulse (for each trigger). The laser pulse travels through optical splitter 240 and travels down the optical fiber to sensor fiber 250, which is deployed to measure temperature in the region of interest.

A short light pulse at a center wavelength is transmitted down sensing fiber 250 and interacts with the structure of the fiber. Some of the energy is shifted to different wavelengths and scattered back along the fiber through e.g. Raman scattering. Some of the energy is shifted to a higher wavelength called the Stokes wavelength, and some is shifted to a lower wavelength called the anti-Stokes wavelength. These backscattered wavelengths travel back to optical switch 240 and through optical filter 260. The different wavelengths are separated by the filter and fed to avalanche photo detectors (APD's) 270. The APD's convert the light signals to analog voltage signals representing the intensity of the separated wavelengths.

The voltage signals from the APD's are analog and are sent to the ADC circuitry of the digitizer 210 where they are converted to digital signals for processing in a programmed signal processor for calculating and displaying the temperature profiles (processor not shown).

The temperature along the sensing fiber can be calculated as a function of the ratio of the intensity of the Stokes and anti-Stokes wavelength signals. The Stokes and anti-stokes signals must be corrected for the wavelength dependent losses along the fiber, and this is often done using the assumption that the difference in optical attenuation between the Stokes and anti-Stokes component is constant over the distance of the fiber with some compensation for thermal effects. The position of the temperature along the fiber is determined by measuring the time of flight between the transmitted and reflected light, and given that the speed of light is known, the location can be calculated. The way to determine the position for Raman based Optical Time Domain Reflectometry (OTDR) DTS technology is similar to what is used in commercially available Optical Time Domain Reflectometry (OTDR) units based on Rayleigh scattering.

Figure 2:
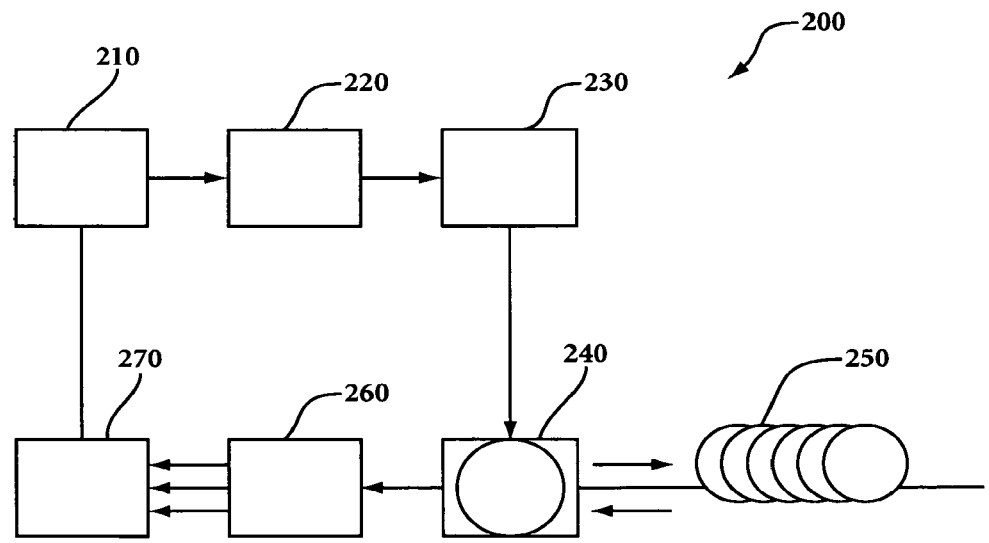
FIG. 2 shows a block diagram of an embodiment of the present disclosure.
Figure 3:
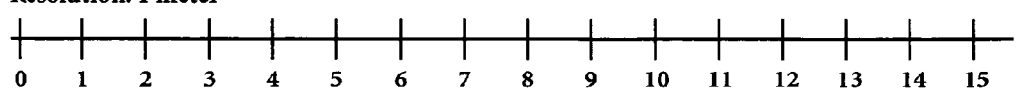
FIG. 3 demonstrates an example of the improved spatial resolution of the present disclosure resulting from the improved sampling method.
Figure 3:
Figure 3:
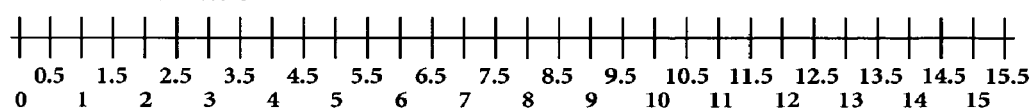

FIG. 3 illustrates the manner in which this inventive concept of improving sampling resolution can improve spatial resolution. Each of the illustrations 300, 400, and 500 represent a fixed length along sensing fiber 250 of FIG. 2.

In operation a series of collections are made with a fixed delay programmed into the digital delay line 220 of FIG. 2. Illustration 300 represents spatial location temperatures one meter apart as measured using Raman based Optical Time Domain Reflectometry (OTDR) DTS technology. Another series of collections are made using a different fixed delay from the digital delay. In the example of illustration 400 a delay of approximately 5 nanoseconds results in a new collection of spatial location temperatures that are still 1 meter apart but delayed by 0.5 meters. Finally illustration 500 demonstrates a set of merged results from the two collections 300 and 400 that now has a resolution of 0.5 meters. The spatial resolution has been doubled in this example.

The example of FIG. 3 is for illustrative purposes. Commercially available digital delay lines such as the Maxim DS1021 (Maxim Integrated Products of Sunnyvale Calif.) are capable of delays in steps of 0.25 nanoseconds.

Since 10 nanoseconds is approximately equivalent to a 1 meter spatial resolution this approach can result in a theoretical sampling resolution of:

$$1 \text{ meter}/10 \text{ nanoseconds}/0.25 \text{ nanoseconds}=0.025 \text{ meters}$$

This significant increase in spatial resolution is achieved without changing the sampling frequency of the ADC card in digitizer 210.

Although certain embodiments of the present invention and their advantages have been described herein in detail, it should be understood that various changes, substitutions and alterations can be made without departing from the spirit and scope of the invention as defined by the appended claims. Moreover, the scope of the present invention is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufactures, means, methods or steps.

The invention claimed is:

1. A method of improving sampling resolution to achieve higher spatial resolution in a single light source Raman based distributed temperature measurement system using a fiber optic distributed sensor comprising the steps of:
   a. providing a trigger voltage signal from a digitizer to a single light source to generate a fixed pulse width light pulse into a sensing fiber;
   b. in a first collection set collecting backscattered Raman Stokes and anti-Stokes light components from said sensing fiber at a fixed sampling frequency;

c. calculating a first set of temperatures points along said fiber optic distributed sensor using the intensities of the backscattered Raman Stokes and anti-Stokes light components;
d. in an additional collection set inducing a fixed delay into said trigger voltage signal to said single light source and collecting backscattered Raman Stokes and anti-Stokes light components from said sensing fiber at a fixed sampling frequency;
e. calculating an additional set of temperatures points along said fiber optic distributed sensor using the intensities of the backscattered Raman Stokes and anti-Stokes light components from said additional collection set;
f. merging said first set of temperature points along said fiber optic distributed sensor with said additional set of temperatures points along said fiber optic distributed sensor to produce a merged set of temperature points along said fiber optic distributed sensor having a higher spatial resolution;
g. repeating steps d and e and then merging said additional set of temperature points along said fiber optic distributed sensor with said merged set of temperatures points along said fiber optic distributed sensor produced in step f to produce a new merged set of temperature points along said fiber optic distributed sensor having a higher spatial resolution;
h. repeating step g until a desired degree of spatial resolution is achieved.

* * * * *

UNITED STATES PATENT AND TRADEMARK OFFICE
CERTIFICATE OF CORRECTION

PATENT NO. : 8,897,608 B2  
APPLICATION NO. : 13/376629  
DATED : November 25, 2014  
INVENTOR(S) : Kent Kalar, Mikko Jaaskelainen and David Barfoot It is certified that error appears in the above-identified patent and that said Letters Patent is hereby corrected as shown below:

In the Claims

Col. 7, in claim 1, lines 1-2, there is a typographical error in claim elements c) and e) as follows: both element c) and e) begin with:

calculating a first set of temperatures points along said fiber and should read:

calculating a first set of temperature points along said fiber

Signed and Sealed this  
Twelfth Day of May, 2015

Michelle K. Lee  
*Director of the United States Patent and Trademark Office*